United States Patent Office 3,514,384
Patented May 26, 1970

3,514,384
METHOD FOR PREPARING FLUORO-CHLOROPOLYMERS
Henry V. Isaacson, Oak Forest, George A. Uhl, Markham, and David W. Young, Homewood, Ill., assignors to Sinclair Research, Inc., New York, N.Y., a corporation of Delaware
No Drawing. Filed Mar. 1, 1967, Ser. No. 619,581
Int. Cl. B01j 1/10
U.S. Cl. 204—158          5 Claims

ABSTRACT OF THE DISCLOSURE

Normally liquid polymers of perfluorochloroethene (e.g. trifluorochloroethylene), vinylidene fluoride and sulfuryl chloride are prepared by exposing a mixture of the aforesaid three monomer components to high energy ionization radiation (e.g. gamma radiation).

---

This invention relates to a novel method of preparing fluorochloro polymers. More particularly, this invention pertains to the preparation of polymers of (A) perfluorochloroethene such as trifluorochloroethylene and difluorodichloro ethylene; (B) vinylidene fluoride; and (C) sulfuryl chloride by high energy ionization radiation polymerization.

Perfluorochloroethylene polymers of the above-named novel three monomer components are useful, for example, as extreme pressure additives in silicone fluids and greases to enhance load-carrying capacity and have been prepared in the past using a chemical catalyst such as benzoyl peroxide which is usually dissolved in an inert solvent, for example, carbon tetrachloride. Such a method is described in U.S. Pat. 2,927,893 to Neunherz. Several advantages can be gained by employing radiation polymerization techniques instead of the conventional chemical procedures. For example, high temperatures are not required in radiation polymerization methods, enabling reactions at ambient temperatures without the necessity of providing heat for the process. Also, unlike chemical catalysis, there is no contamination in the products obtained using radiation polymerization methods, since the radiation source need not come in direct contact with the reactant materials. Other advantages such as a constant and easily controlled reaction are obtained using radiation polymerization methods. Although the art has recognized that certain perfluorochloro polymers can be prepared by exposing the reactants to ultra-violet light, perfluorochloro polymers of the above named three monomer components cannot be made using this method.

We have now discovered that such perfluorochloro polymers of the above designated A, B and C monomers can be prepared by subjecting the components to high energy ionization radiation, such as gamma radiation. In addition to gamma radiation various other high energy ionizing radiations can be employed for the purpose of the present invention, for example gamma- or X-rays, beta-rays (high speed electrons) and various densely ionizing particles such as neutrons, protons, deuterons, alpha particles, etc. The preferred form of radiation is gamma-radiation obtained from radioactive materials. One very convenient form is cobalt–60 which can be readily obtained by subjecting ordinary cobalt–59 metal to irradiation in an atomic pile. Cobalt–60 has a half-life of 5.3 years, and emits gamma-radiation of 1.33 and 1.17 m.e.v. (million electron volts).

Numerous other gamma-emitting radioisotopes available from chain-reacting piles and cyclotrons can also be used as radiation sources. Other materials providing gamma-radiation include low cost fission products from nuclear reactors or such a reactor per se. Choice of a particular source of gamma-radiation may depend upon availability, expense, intensity and the convenience of handling. For instance, a Van de Graaff linear accelerator with conversion of electrons to X-ray by use of a gold target may be used. A 14,000 curie source of cobalt–60 was used in obtaining the particular data set forth hereinbelow. Green fuel elements from an atomic pile make a convenient source of gamma-radiation; green fuel elements are made up of the initial radioactive material charged to the atomic pile, e.g., uranium–235, having associated therewith the various products of radioactive decay, and such elements are highly radioactive and are normally stored for a considerable length of time before chemical processing is attempted. The radiation energy being emitted during such time is normally wasted, and can be used to advantage in the present invention. The polymerizations of the present invention can, if desired, be effected in an atomic pile, the location in the pile of course being selected to give the desired type and intensity of radiation. The application of the radiant energy may be used either in a batch or a flow-type process.

Irradiation of the mixture of perfluorochloroethylene, vinylidene fluoride and sulfuryl chloride is conveniently carried out at room temperatures of say about 60° to 80° F., although temperatures falling within the range of from about −100° to 250° F. may be employed. Radiation time and intensity may vary depending upon the degree of polymerization, i.e., the molecular weight of the polymer product desired. Generally, however, high energy ionization radiation of an intensity of about $1 \times 10^4$ to $1 \times 10^7$, preferably about $1 \times 10^5$ to $1 \times 10^6$ roentgen per hour (r./hr.) may be applied for a time sufficient to effect the desired polymerization of reactants, often about 50 to 500 hours. The molar ratio of sulfuryl chloride: perfluorochloroethylene:vinylidene fluoride utilized is generally about 1 to about 1.5 to 5 or even to 10 to about 0.75 to 3 or even to 6.

The polymers prepared according to the process of the invention are normally liquid, for instance, having average molecular weights of at least about 400, preferably up to 5000 or more. The polymers may distill primarily in the range of about 100 to 300° C. or more at 1 mm. Hg, and may have a kinematic viscosity at 100° F. of about 20 to 1500 centistokes. The polymers may be used as such or distilled to select more desirable fractions. Frequently the polymers made by our process are soluble in polysilicone and synthetic ester lubricants, and the reaction conditions such as time, radiation, intensity, etc., can be selected to give this result.

The following examples are included to further illustrate the invention and are not intended to be limiting.

EXAMPLE I

Ultra-violet irradiation of 5.43 moles of sulfuryl chloride, 11 moles of chlorotrifluoroethylene and 5.5 moles of vinylidene fluoride in a PITU quartz reactor was continued for 24 hours using a 450 watt Hanovia mercury-vapor lamp. No reaction or polymer product was obtained.

EXAMPLE II

A 100 ml. one-inch bomb was charged with sulfuryl chloride (31 g.) (.228 mole) chlorotrifluoroethylene (54 g.) (.461 mole) and vinylidene fluoride (15 g.) (.234 mole). The bomb was then irradiated at room temperature using a cobalt–60 source for 161 hours at a dose rate of $3.85 \times 10^5$ r./hr. This yielded a total dose of 62 megarep. A pressure drop from 180 p.s.i. to 110 p.s.i. was noted. The product was then stripped of excess monomer to give a yield of 16 g. (24% yield based on total olefin).

EXAMPLE III

The value of the polymers prepared according to the process of the invention as extreme pressure additives in silicone fluids is demonstrated in Table I. Silicon D, a mixture of polymers of the homologous series of trimethyl end-blocked dimethyl siloxane polymers having a viscosity at 25° C. ranging up to about 12,500 centistokes, was blended with 10% by weight of the polymer prepared in Example II and the resulting blend tested for load carrying capacity employing the Shell Four Ball Wear Test. In the Shell Four Ball Wear Test a tester is employed consisting essentially of three contacting steel balls held in a fixed position relative to each other and a fourth ball above and in contact with the other three. The fourth ball is pressed against the three stationary balls at an adjustable speed and rotated at a constant speed. The points of contact are lubricated. During a test, circular scars are worn in the surface of the three stationary balls. The diameter of the scars is a measure of the wear. For comparison, tests on the silicone fluid without polymer additive were also run. The test conditions and the results demonstrating greater wear reduction using the silicone blends containing the polymer are shown in Table I.

RESULTS OF SHELL FOUR-BALL WEAR TESTS

| Test conditions | Silicone | Halocarbon | Wt. percent in blend | Avg. diameter of wear scars (mm.) |
| --- | --- | --- | --- | --- |
| Room temp., 6 kg. load, 1,200 r.p.m., 5 hrs. | D | | | 0.58 |
| | D | Polymer product | 10 | 0.31 |
| Room temp., 40 kg. load, 1,200 r.p.m., 1 hr. | D | | | 1.77 |
| | D | Polymer product | 10 | *0.49 |

* Run at 640 r.p.m. instead of 1,200 r.p.m.

It is claimed:

1. A process for the preparation of normally liquid polymers which comprises subjecting a mixture of sulfuryl chloride, perfluorochloroethene and vinylidene fluoride in a molar ratio of about 1: about 1.5 to 10: about 0.75 to 6, respectively, to high energy ionization radiation of an intensity of about $1 \times 10^4$ to $1 \times 10^7$ roentgens per hour for a time sufficient to effect said polymerization of said sulfuryl chloride, perfluorochloroethene and vinylidene fluoride.

2. The process of claim 1 wherein said radiation is gamma radiation.

3. The process of claim 2 wherein the radiation has an intensity of about $1 \times 10^5$ to $1 \times 10^6$ roentgens per hour and is continued for about 50 to 500 hours.

4. The process of claim 3 wherein the perfluorochloroethene is chlorotrifluoroethylene.

5. The process of claim 1 wherein the perfluorochloroethene is chlorotrifluoroethylene.

References Cited

UNITED STATES PATENTS 2,880,154   3/1959   Borland et al. _____ 204—163
3,086,058   4/1963   Harris _____ 204—158

HOWARD S. WILLIAMS, Primary Examiner

U.S. Cl. X.R.
204—163